United States Patent
Li et al.

(10) Patent No.: US 10,522,886 B2
(45) Date of Patent: Dec. 31, 2019

(54) BATTERY UNIT, BATTERY MODULE AND BATTERY PACK

(71) Applicant: CONTEMPORARY AMPEREX TECHNOLOGY CO., LIMITED, Ningde (CN)

(72) Inventors: Qing Li, Ningde (CN); Ruobo You, Ningde (CN)

(73) Assignee: CONTEMPORARY AMPEREX TECHNOLOGY CO., LIMITED, Ningde, Fujian Province (CN)

( * ) Notice: Subject to any disclaimer, the term of this patent is extended or adjusted under 35 U.S.C. 154(b) by 79 days.

(21) Appl. No.: 15/489,358

(22) Filed: Apr. 17, 2017

(65) Prior Publication Data

US 2017/0222285 A1    Aug. 3, 2017

Related U.S. Application Data

(63) Continuation of application No. PCT/CN2015/097281, filed on Dec. 14, 2015.

(30) Foreign Application Priority Data

Dec. 1, 2015   (CN) .......................... 2015 1 08602935

(51) Int. Cl.
  *H01M 10/6571*   (2014.01)
  *H01M 10/6568*   (2014.01)
  (Continued)

(52) U.S. Cl.
  CPC ..... *H01M 10/6571* (2015.04); *H01M 2/1077* (2013.01); *H01M 10/0525* (2013.01);
  (Continued)

(58) Field of Classification Search
  CPC .. H01M 10/657–06572; H01M 10/6567–6569
  See application file for complete search history.

(56) References Cited

U.S. PATENT DOCUMENTS

2008/0179315 A1   7/2008   Suzhouki et al.

FOREIGN PATENT DOCUMENTS

| CN | 201345397 Y | 11/2009 |
| CN | 202695678 U | 1/2013 |

(Continued)

OTHER PUBLICATIONS machine translation of CN204809357, (Year: 2015).*

(Continued)

*Primary Examiner* — Jayne L Mershon
(74) *Attorney, Agent, or Firm* — Morgan, Lewis & Bockius LLP

(57) ABSTRACT

The present disclosure provides a battery unit, a battery module and a battery pack. A battery pack comprises: at least one battery module; and a heating film sheet directly or indirectly heating the at least one battery module. The heating film sheet comprises a heating core and two insulating films. The heating core generates heat when the heating core is electrified, and has: a wire connection region for electrically connecting with external wires; and a heating region electrically connecting with the wire connection region, rated heating powers of different parts of the heating region are different so as to meet demand for heat of each battery module in each of different regions of the at least one battery module when the at least one battery module is heated. The two insulating films respectively cover two sides of the heating core. In the battery pack, each battery module is heated by the heating film sheet, and the rated heating powers of the different parts of the heating region of the heating core are different, so the heat provided for each battery module in the different region of the battery pack can be determined according to the demand for heat of each battery module in the different region of the battery pack, (Continued)

and in turn it ensures that each battery module of the battery pack is heated uniformly by the heating film sheet.

1 Claim, 9 Drawing Sheets

(51) Int. Cl.
| | | |
|---|---|---|
| *H01M 10/6561* | (2014.01) | |
| *H01M 10/0525* | (2010.01) | |
| *H01M 10/617* | (2014.01) | |
| *H01M 10/615* | (2014.01) | |
| *H01M 2/10* | (2006.01) | |
| *H01M 10/6556* | (2014.01) | |
| *H01M 10/6555* | (2014.01) | |
| *H01M 10/655* | (2014.01) | |

(52) U.S. Cl.
CPC ....... *H01M 10/615* (2015.04); *H01M 10/617* (2015.04); *H01M 10/6555* (2015.04); *H01M 10/6556* (2015.04); *H01M 10/6561* (2015.04); *H01M 10/6568* (2015.04); *H01M 10/655* (2015.04)

(56) References Cited

FOREIGN PATENT DOCUMENTS

| | | |
|---|---|---|
| CN | 203883092 U | 10/2014 |
| CN | 104716401 A | 6/2015 |
| CN | 204809357 U | 11/2015 |
| CN | 204947033 U | 1/2016 |

OTHER PUBLICATIONS

Ningde Contemporary Amperex Technology Co., Ltd., First Office Action, CN20151086293.5, dated Oct. 23, 2018, 20 pgs.
Contemporary Amperex Technology Co., Limited, Extended European Search Report, EP15909587.6, dated Jul. 18, 2019, 8 pgs.

* cited by examiner

BATTERY UNIT, BATTERY MODULE AND BATTERY PACK

CROSS-REFERENCE TO RELATED APPLICATIONS

This application is a continuation of PCT/CN2015/097281, filed on Dec. 14, 2015, which claims priority to Chinese Patent Application Serial No. 2015108602935, filed Dec. 1, 2015, all of which are incorporated herein by reference in their entirety.

FIELD OF THE PRESENT DISCLOSURE

The present disclosure relates to the field of battery, and particularly relates to a battery unit, a battery module and a battery pack.

BACKGROUND OF THE PRESENT DISCLOSURE

Currently, when a lithium ion battery is used under 20~40 degrees, the charge and discharge performance of the lithium ion battery is generally the best, and the life is the best. When the battery is in a low temperature environment, it needs to make the temperature of the battery go back to the best working temperature range by means of the heating function of thermal management. While, it usually adopts two heating methods, i.e. external PTC heating and hot air heating, to heat the battery in the market.

Referring to FIG. 1, the external PTC heating is that a heat exchanger 9 for flowing through the liquid is integrated in a battery pack P, while the liquid in a tank 7 is pumped by a pump 10, heated by a PTC heater 8 and then enters into the heat exchanger 9, so that heat exchange is performed between each mono-battery 1 of the battery module M and the liquid working medium. Along the flowing direction, the liquid working medium transfers the heat continuously to each mono-battery 1 of the battery module M in the path, thus the temperature of the liquid working medium decreases gradually, and the capability of transferring heat decreases gradually. Therefore, each mono-battery 1 of the battery module M in the flowing path receives the different quantity of heat, the longer the flowing path is, the bigger the difference of the temperature between each other is. Thus, the mono-battery 1 of the battery module M at the end of the flowing path receives the minimum heat, and the rising speed of temperature is the slowest, which affects the heating efficiency of the whole module. In addition, due to the endothermic effect of piping components and the heat loss of pipe wall exposed to the circumstance, a very large part of heat cannot be used by the battery module in the PTC heating, and the effective utilization of heat is low.

Referring to FIG. 2, the hot air heating is that hot air produced by a hot air heater A is pumped into the battery pack P by a blower B of the battery pack P, thereby improving an internal environment temperature of the battery pack P and heating each mono-battery 1 of the battery module M. Due to air as the medium, such a heating way is easily implemented, but the efficiency of heating is lower, and an IP level of a battery pack case C is low. Alternatively, the hot air heater is integrated into the battery pack case C, but the space occupied by the hot air heater A is large, the integration degree of product is poor, which is not beneficial to market the product, at the same time the battery pack case C needs a relatively bigger space to optimize a flow duct of air, so as to improve uniformity of the temperature of the battery, which results in the space utilization of the battery pack P low.

As can be seen from the two modes of heating, the existing problems and defects of the prior art is: heat is transmitted through the fluid, the structure is complex, many components are related, and the demand of space is big; the heat has a large loss and the effective utilization of heat is low during heat transmission; because it is difficult to control the heat loss along the flowing path of the fluid as desired, so the wooden barrel short board effect of heating function is obvious; the difference of the temperature of the heated object is large and is difficult to control.

SUMMARY OF THE PRESENT DISCLOSURE

In view of the problem existing in the background, an object of the present disclosure is to provide a battery unit, which uses a heating film sheet to heat a mono-battery, can provide a corresponding heat depended on the demand for heat in different regions of the mono-battery, and thus ensure that the mono-battery is uniformly heated by the heating film sheet.

Another object of the present disclosure is to provide a battery module, which uses a heating film sheet to heat each mono-battery, can save space and at the same time provide a corresponding heat depended on the demand for heat of each mono-battery, and thus ensure that each mono-battery is uniformly heated by the heating film sheet.

Still another object of the present disclosure is to provide a battery pack, which uses a heating film sheet to heat each battery module, can save space and at the same time provide a corresponding heat depended on the demand for heat of each battery module, and thus ensure that each battery module is uniformly heated by the heating film sheet.

In order to achieve the above objects, in a first aspect, the present disclosure provides a battery unit, which comprises: one mono-battery having two end surfaces; and at least one heating film sheet, each heating film sheet is adhered to one end surface of the mono-battery. Each heating film sheet comprises a heating core and two insulating films. The heating core generates heat when the heating core is electrified, and has: a wire connection region for electrically connecting with external wires; and a heating region electrically connecting with the wire connection region, rated heating powers of different parts of the heating region are different, so as to meet demand for heat in different regions of the mono-battery when the mono-battery is heated. The two insulating films respectively cover two sides of the heating core.

In order to achieve the above objects, in a second aspect, the present disclosure provides a battery module, which comprises: a plurality of mono-batteries arranged side by side; a box for fixing and receiving the plurality of mono-batteries; and at least one heating film sheet received in the box and contacting the plurality of mono-batteries. Each heating film sheet comprises a heating core and two insulating films. The heating core generates heat when the heating core is electrified, and has: a wire connection region for electrically connecting with external wires; and a heating region electrically connecting with the wire connection region, rated heating powers of different parts of the heating region are different, so as to meet demand for heat of each mono-battery in each of different regions of the plurality of mono-batteries when the plurality of mono-batteries are heated. The two insulating films respectively cover two sides of the heating core.

In order to achieve the above objects, in a third aspect, the present disclosure provides a battery pack, which comprises: at least one battery module; and a heating film sheet directly or indirectly heating the at least one battery module. The heating film sheet comprises a heating core and two insulating films. The heating core generates heat when the heating core is electrified, and has: a wire connection region for electrically connecting with external wires; and a heating region electrically connecting with the wire connection region, rated heating powers of different parts of the heating region are different so as to meet demand for heat of each battery module in each of different regions of the at least one battery module when the at least one battery module is heated. The two insulating films respectively cover two sides of the heating core.

The present disclosure has the following beneficial effects:

In the battery unit according to the present disclosure, the end surface of the mono-battery is heated by the heating film sheet, and the rated heating powers of the different parts of the heating region of the heating core are different, so heat provided for the different regions of the mono-battery can be determined according to demand for heat in the different regions of the mono-battery, and in turn it ensures that the mono-battery is uniformly heated by the heating film sheet.

In the battery module according to the present disclosure, each mono-battery of the battery module is heated by the heating film sheet, and the rated heating powers of the different parts of the heating region of the heating core are different, so heat provided for each mono-battery in the different region of the battery module can be determined according to the demand for heat of each mono-battery in the different region of the battery module, and in turn it ensures that each mono-battery of the battery module is uniformly heated by the heating film sheet.

In the battery pack according to the present disclosure, each battery module in the battery pack is heated by the heating film sheet, and the rated heating powers of the different parts of the heating region of the heating core are different, so heat provided for each battery module in the different region of the battery pack can be determined according to the demand for heat of each battery module in the different region of the battery pack, and in turn it ensures that each battery module of the battery pack is uniformly heated by the heating film sheet.

REFERENCE NUMERALS ARE REPRESENTED AS FOLLOWS

Figure 1:
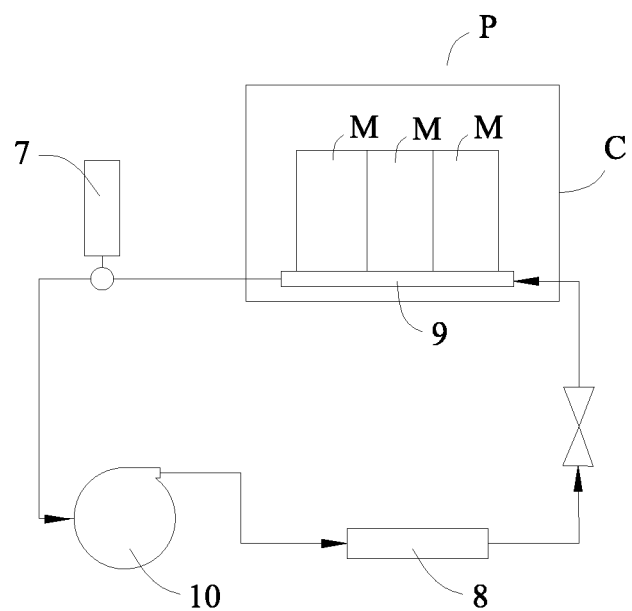
FIG. 1 is a schematic diagram of a method of an external PTC heating in the prior art.
Figure 2:
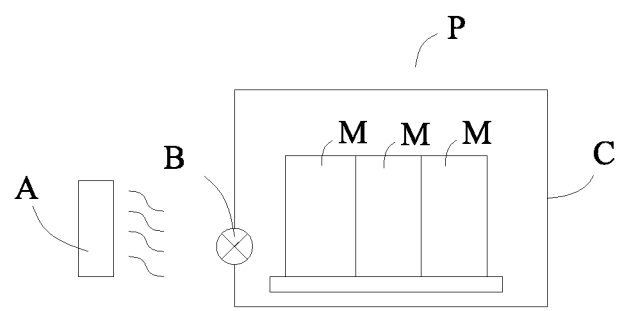
FIG. 2 is a schematic diagram of a method of the hot air heating in the prior art.

E battery unit
M battery module
P battery pack
1 mono-battery
11 end surface
12 side surface
13 bottom surface
2 box
21 end plate
22 side plate
23 top plate
3 heating film sheet
31 heating core
311 wire connection region
3111 first wire connection region
3112 second wire connection region
312 heating region
3121 first central heating region
3122 first edge heating region
3123 second central heating region
3124 second edge heating region
3125 third central heating region
3126 third edge heating region
3127 fourth central heating region
3128 fourth edge heating region
3129 fifth central heating region
312A fifth edge heating region
312B sixth central heating region
312C sixth edge heating region
312D seventh central heating region
312E seventh edge heating region
312F eighth central heating region
312G eighth edge heating region
313 bridge region 32 insulating film
4 air cooling assembly
5 liquid cooling assembly
51 liquid cooling tube
6 spacer
7 tank
8 PTC heater
9 heat exchanger
10 pump
A hot air heater
B blower
C battery pack case
W wire
D arrangement direction

DETAILED DESCRIPTION

Hereinafter a battery unit, a battery module and a battery pack according to the present disclosure will be described in detail in combination with the figures.

Firstly, a battery unit according to a first aspect of the present disclosure will be described.

Figure 3:
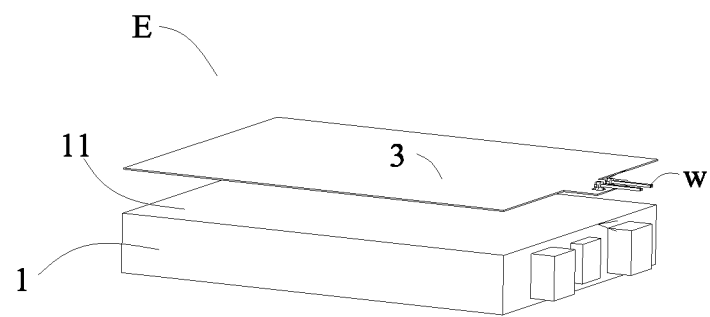
FIG. 3 is a perspective view of a battery unit according to the present disclosure.
Figure 4:
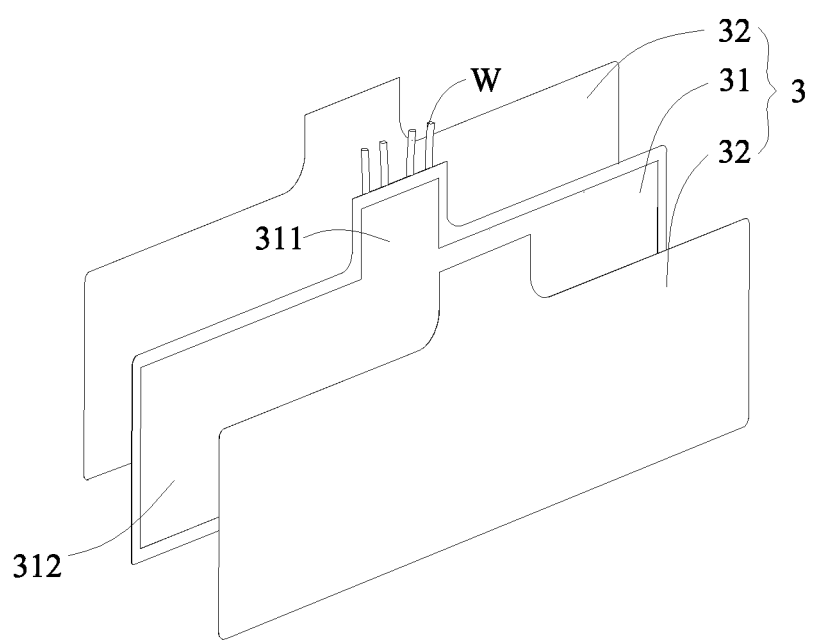
FIG. 4 is a perspective view of a heating film sheet of the battery unit according to the present disclosure.
Figure 5:
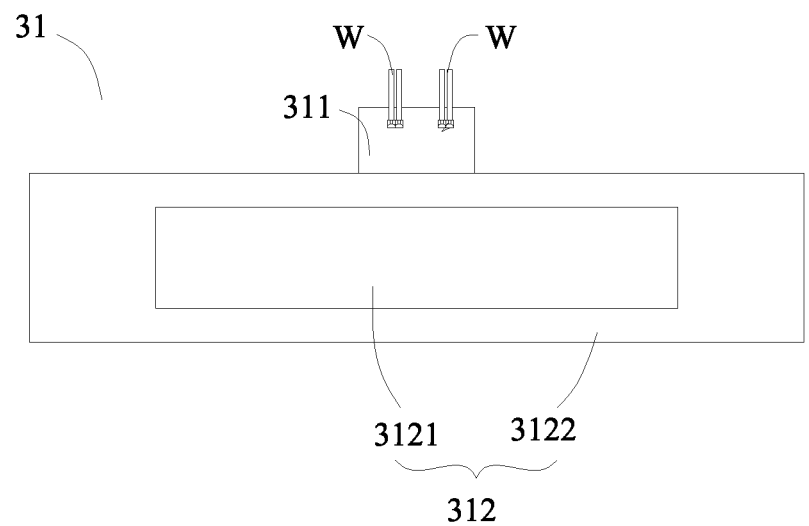
FIG. 5 is a schematic diagram of a heating core of the heating film sheet in FIG. 4.

Referring to FIGS. 3-5, a battery unit E according to the present disclosure comprises: one mono-battery 1 having two end surfaces 11; and at least one heating film sheet 3, each heating film sheet 3 is adhered to one end surface 11 of the mono-battery 1. Each heating film sheet 3 comprises a heating core 31 and two insulating films 32. The heating core 31 generates heat when the heating core 31 is electrified, and has: a wire connection region 311 for electrically connecting with external wires W; and a heating region 312 electrically connecting with the wire connection region 311, rated heating powers of different parts of the heating region 312 are different, so as to meet demand for heat in different regions of the mono-battery 1 when the mono-battery 1 is heated. The two insulating films 32 respectively cover two sides of the heating core 31.

In addition, it should be noted that, the rated heating powers of the different parts of the heating region 312 are determined by thermal simulation analysis and test validation optimization.

In the battery unit E according to the present disclosure, the end surface 11 of the mono-battery 1 is heated by the heating film sheet 3, and the rated heating powers of the different parts of the heating region 312 of the heating core 31 are different, so heat provided for the different regions of the mono-battery 1 can be determined according to demand for heat in the different regions of the mono-battery 1, and in turn it ensures that the mono-battery 1 is uniformly heated by the heating film sheet 3.

In the battery unit E according to the present disclosure, referring to FIG. 5, in an embodiment, the heating region 312 of the heating core 31 of each heating film sheet 3 has: a first central heating region 3121 facing a middle part of the end surface 11 of the mono-battery 1; and a first edge heating region 3122 provided around the first central heating region 3121 and facing a peripheral of the end surface 11 of the mono-battery 1.

In the battery unit E according to the present disclosure, in an embodiment, a rated heating power of the first edge heating region 3122 is higher than a rated heating power of the first central heating region 3121.

In the battery unit E according to the present disclosure, in an embodiment, a ratio of the rated heating power of the first edge heating region 3122 to the rated heating power of the first central heating region 3121 is 2:1.

Secondly, a battery module according to a second aspect of the present disclosure will be described.

Referring to FIGS. 6-11, a battery module M according to the present disclosure comprises: a plurality of mono-batteries 1 arranged side by side; a box 2 for fixing and receiving the plurality of mono-batteries 1; and at least one heating film sheet 3 received in the box 2 and contacting the plurality of mono-batteries 1. Each heating film sheet 3 comprises a heating core 31 and two insulating films 32. The heating core 31 generates heat when the heating core 31 is electrified, and has: a wire connection region 311 for electrically connecting with external wires W; and a heating region 312 electrically connecting with the wire connection region 311, rated heating powers of different parts of the heating region 312 are different, so as to meet demand for heat of each mono-battery in each of different regions of the plurality of mono-batteries 1 when the plurality of mono-batteries 1 are heated. The two insulating films 32 respectively cover two sides of the heating core 31.

In the battery module M according to the present disclosure, each mono-battery 1 of the battery module M is heated by the heating film sheet 3, and the rated heating powers of the different parts of the heating region 312 of the heating core 31 are different, so heat provided for each mono-battery 1 in the different region of the battery module M can be determined according to the demand for heat of each mono-battery 1 in the different region of the battery module M, and in turn it ensures that each mono-battery 1 of the battery module M is uniformly heated by the heating film sheet 3.

Figure 6:
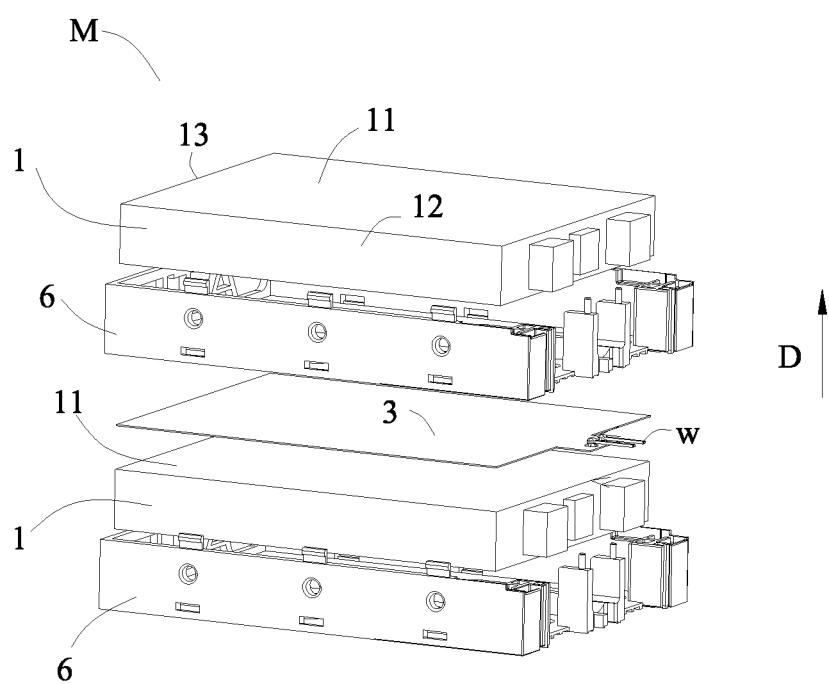
FIG. 6 is a perspective view of an embodiment of a battery module according to the present disclosure, in which a box is omitted and the heating film sheet contacts an end surface of a mono-battery.
Figure 8:
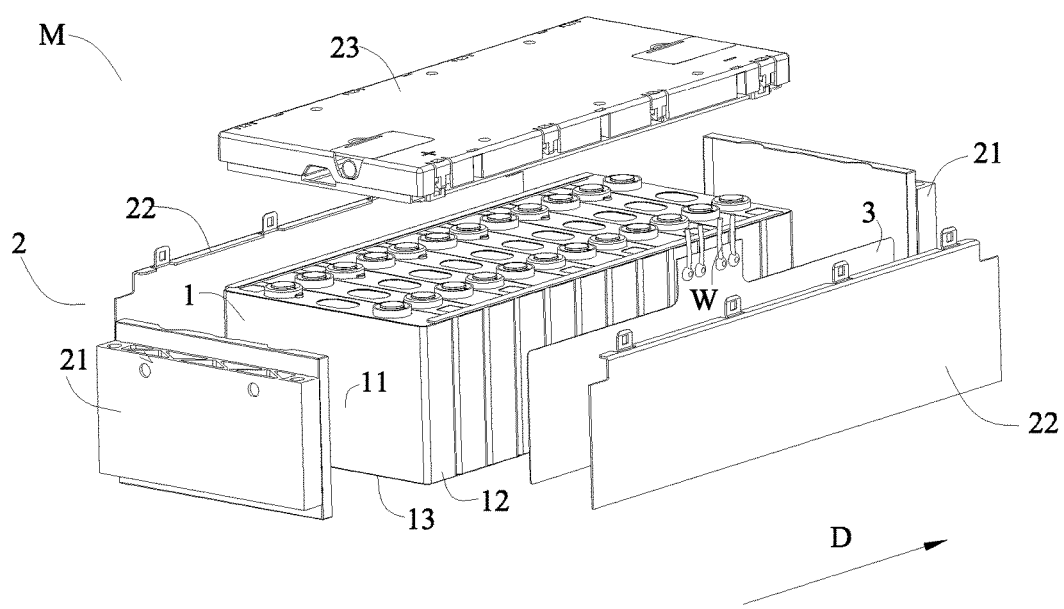
FIG. 8 is a perspective view of another embodiment of the battery module according to the present disclosure, in which the heating film sheet contacts side surfaces of mono-batteries.
Figure 10:
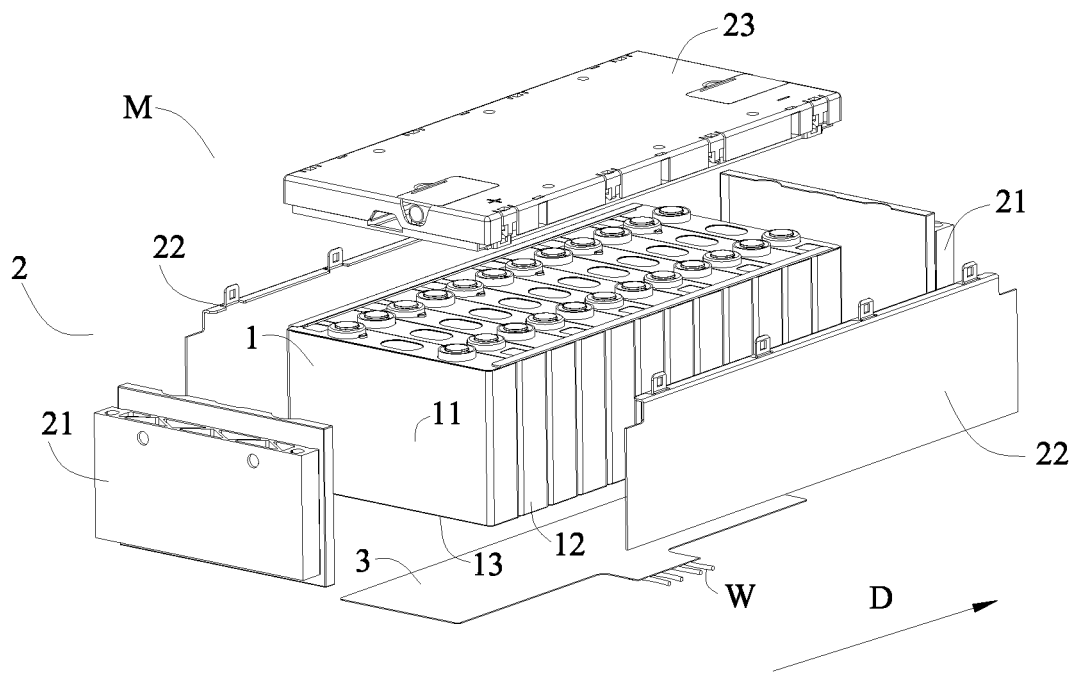
FIG. 10 is a perspective view of still another embodiment of the battery module according to the present disclosure, in which a heating film sheet contacts bottom surfaces of mono-batteries.

In the battery module M according to the present disclosure, referring to FIG. 6, FIG. 8 and FIG. 10, in an embodiment, each mono-battery 1 has two end surfaces 11, two side surfaces 12 and one bottom surface 13.

In the battery module M according to the present disclosure, referring to FIG. 6, in an embodiment, the battery module M further comprises: a plurality of spacers 6, each spacer 6 is provided between the two end surfaces 11 of the two adjacent mono-batteries 1; one heating film sheet 3 is provided between one end surface 11 of each mono-battery 1 and the corresponding spacer 6.

Figure 7:
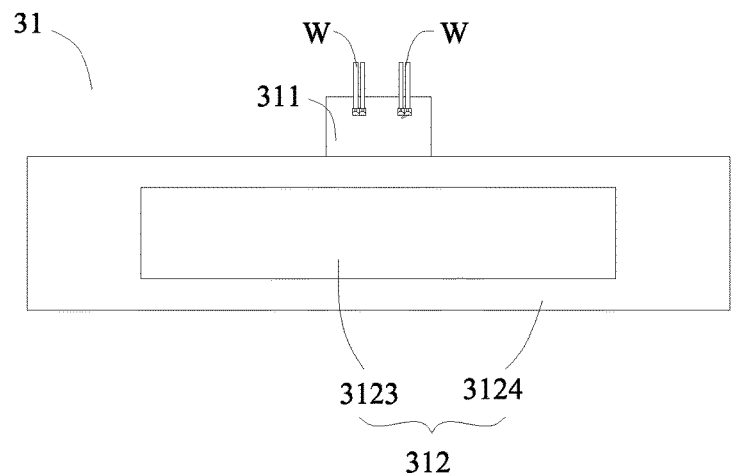
FIG. 7 is a schematic diagram of a heating core of the heating film sheet in FIG. 6.

In the battery module M according to the present disclosure, referring to FIG. 7, in an embodiment, the heating region 312 of the heating core 31 of each heating film sheet 3 has: a second central heating region 3123 facing a middle part of the end surface 11 of the corresponding mono-battery 1; and a second edge heating region 3124 provided around the second central heating region 3123 and facing a periphery of the end surface 11 of the corresponding mono-battery 1.

In the battery module M according to the present disclosure, in an embodiment, a rated heating power of the second edge heating region 3124 is higher than a rated heating power of the second central heating region 3123.

In the battery module M according to the present disclosure, in an embodiment, a ratio of the rated heating power of the second edge heating region 3124 to the the rated heating power of the second central heating region 3123 is 2:1.

In the battery module M according to the present disclosure, referring to FIG. 8, in an embodiment, the heating film sheet 3 contacts with the side surfaces 12 of all the mono-batteries 1 which are arranged side by side in the battery module M.

Figure 9:
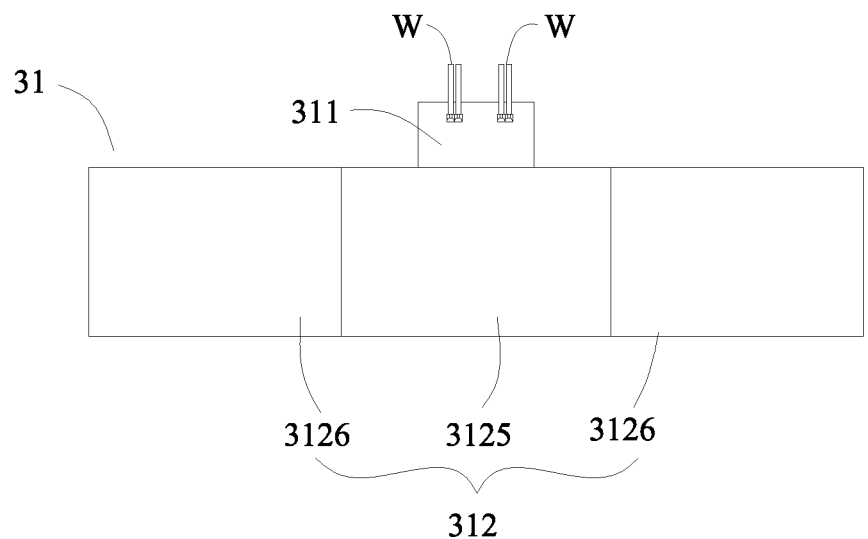
FIG. 9 is a schematic diagram of a heating core of the heating film sheet in FIG. 8.

In the battery module M according to the present disclosure, referring to FIG. 9, in an embodiment, the heating region 312 of the heating core 31 of the heating film sheet 3 has: a third central heating region 3125 contacting the side surfaces 12 of the mono-batteries 1 which are positioned in a middle part of the battery module M; and two third edge heating regions 3126 provided at two sides of the third central heating region 3125 and contacting the side surfaces 12 of the mono-batteries 1 which are positioned at two sides of the battery module M.

In the battery module M according to the present disclosure, in an embodiment, a rated heating power of the third edge heating region 3126 is higher than a rated heating power of the third central heating region 3125.

In the battery module M according to the present disclosure, in an embodiment, a ratio of the rate heating power of the third edge heating region 3126 to the rate heating power of the third central heating region 3125 is 2:1.

In the battery module M according to the present disclosure, referring to FIG. 10, in an embodiment, the heating film sheet 3 contacts the bottom surfaces 13 of all the mono-batteries 1 which are arranged side by side in the battery module M.

Figure 11:
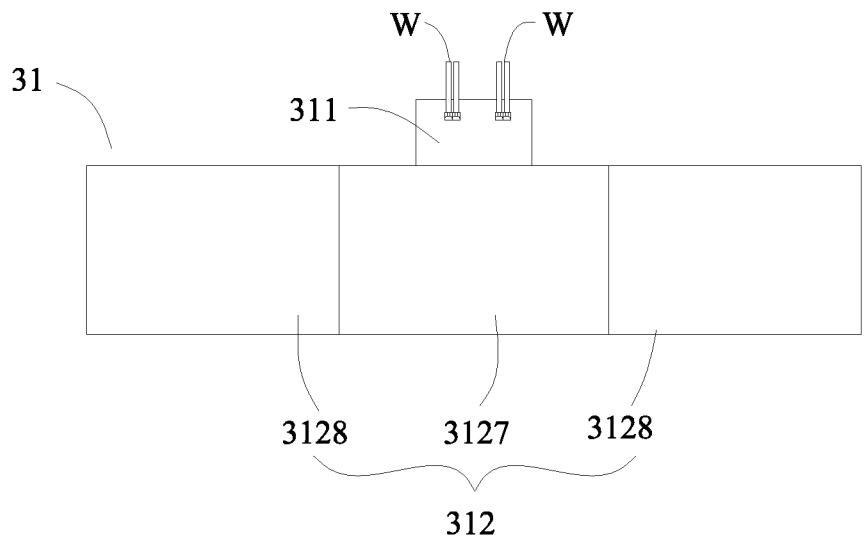
FIG. 11 is a schematic diagram of a heating core of the heating film sheet in FIG. 10.

In the battery module M according to the present disclosure, referring to FIG. 11, in an embodiment, the heating region 312 of the heating core 31 of the heating film sheet 3 has: a fourth central heating region 3127 contacting the bottom surfaces 13 of the mono-batteries 1 which are positioned in a middle part of the battery module M; and two fourth edge heating regions 3128 provided at two sides of the fourth central heating region 3127 and contacting the bottom surfaces 13 of the mono-batteries 1 which are positioned at two sides of the battery module M.

In the battery module M according to the present disclosure, in an embodiment, a rated heating power of the fourth edge heating region 3128 is higher than a rated heating power of the fourth central heating region 3127.

In the battery module M according to the present disclosure, in an embodiment, a ratio of the rated heating power of the fourth edge heating region 3128 to the rated heating power of the fourth central heating region 3127 is 2:1.

In the battery module M according to the present disclosure, referring to FIG. 8 and FIG. 10, in an embodiment, the box 2 comprises: two end plates 21; two side plates 22 fixed and connected to the two end plates 21; and one top plate 23 fixed and connected to the two end plates 21 and the two side plates 22 from above.

Finally, a battery pack according to a third aspect of the present disclosure will be described.

Referring to FIGS. 12-17, a battery pack P according to the present disclosure comprises: at least one battery module M; and a heating film sheet 3 directly or indirectly heating the at least one battery module M. The heating film sheet 3 comprises a heating core 31 and two insulating films 32. The heating core 31 generates heat when the heating core 31 is electrified, and has: a wire connection region 311 for electrically connecting with external wires W; and a heating region 312 electrically connecting with the wire connection region 311, rated heating powers of different parts of the heating region 312 are different so as to meet demand for heat of each battery module M in each of different regions of the at least one battery module M when the at least one battery module M is heated. The two insulating films 32 respectively cover two sides of the heating core 31.

In the battery pack P according to the present disclosure, each battery module M in the battery pack P is heated by the heating film sheet 3, and the rated heating powers of the different parts of the heating region 312 of the heating core 31 are different, so heat provided for each battery module M in the different region of the battery pack P can be determined according to the demand for heat of each battery module M in the different region of the battery pack P, and in turn it ensures that each battery module M of the battery pack P is uniformly heated by the heating film sheet 3.

Figure 12:
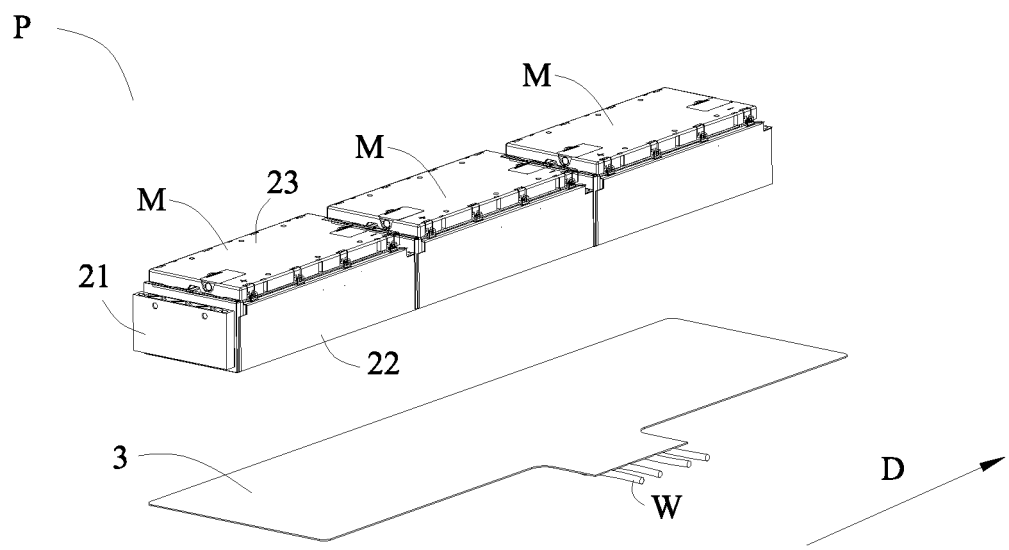
FIG. 12 is a perspective view of an embodiment of a battery pack according to the present disclosure, in which a heating film sheet directly contacts a battery module.

In the battery pack P according to the present disclosure, referring to FIG. 12, in an embodiment, the heating film sheet 3 is provided to a bottom of the at least one battery module M and directly heats each battery module M.

Figure 13:
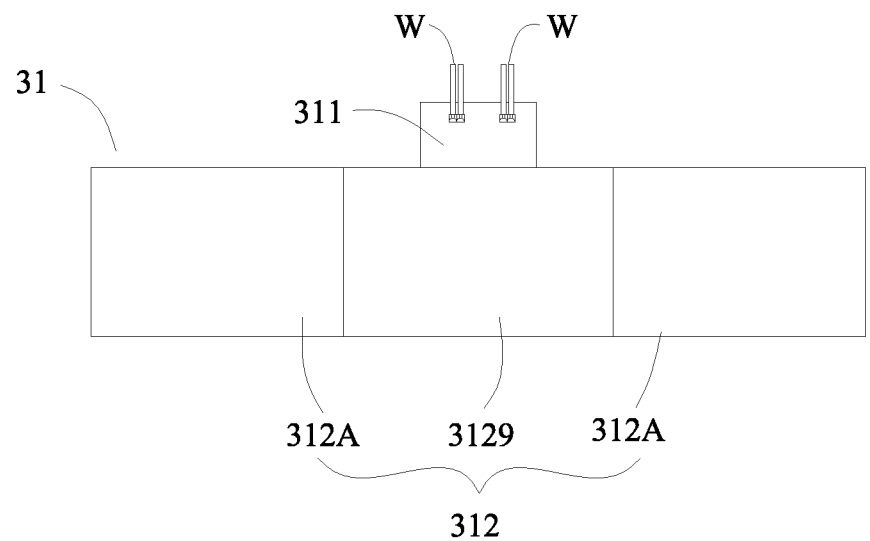
FIG. 13 is a schematic diagram of a heating core of a heating film sheet in FIG. 12.

In the battery pack P according to the present disclosure, referring to FIG. 13, in an embodiment, the heating region 312 of the heating core 31 of the heating film sheet 3 has: a fifth central heating region 3129 contacting each battery module M which is positioned in a middle part of the battery pack P; and two fifth edge heating regions 312A provided at two sides of the fifth central heating region 3129 and contacting the battery modules M which are positioned at two sides of the battery pack P.

In the battery pack P according to the present disclosure, in an embodiment, a rated heating power of the fifth edge heating region 312A is higher than a rated heating power of the fifth central heating region 3129.

In the battery pack P according to the present disclosure, in an embodiment, a ratio of the rated heating power of the fifth edge heating region 312A to the fifth central heating region 3129 is 2:1.

Figure 14:
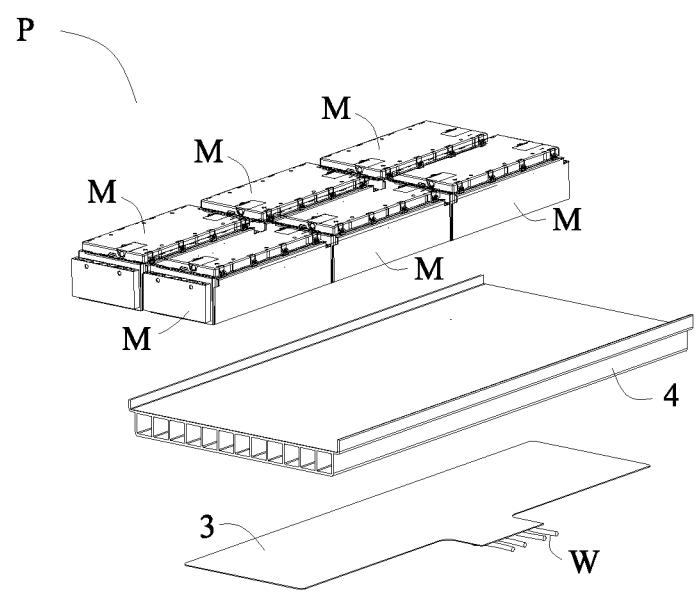
FIG. 14 is a perspective view of another embodiment of the battery pack according to the present disclosure, in which a heating film sheet contacts a battery module via an air cooling assembly.

In the battery pack P according to the present disclosure, referring to FIG. 14, in an embodiment, the battery pack. P further comprises: an air cooling assembly 4 provided to a bottom of the at least one battery module M.

In the battery pack P according to the present disclosure, referring to FIG. 14, in an embodiment, the heating film sheet 3 is provided under the air cooling assembly 4 and indirectly heats the at least one battery module M via the air cooling assembly 4.

Figure 15:
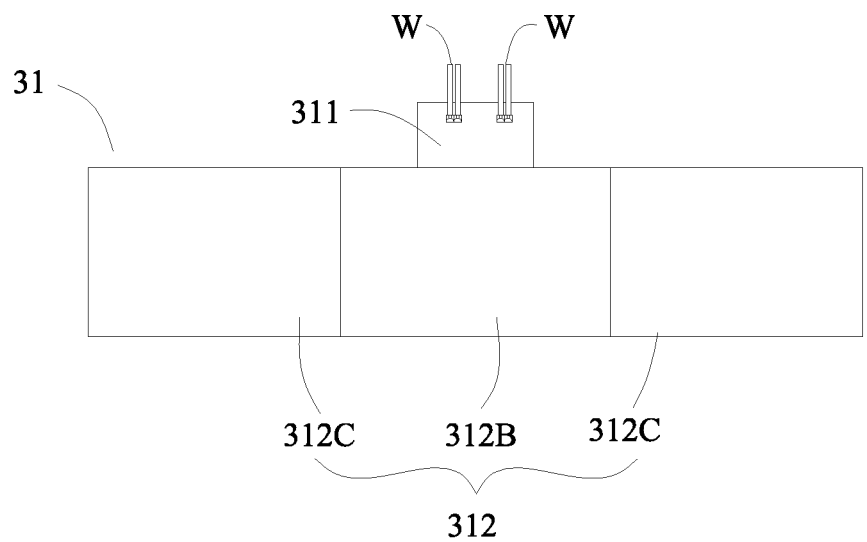
FIG. 15 is a schematic diagram of a heating core of the heating film sheet in FIG. 14.

In the battery pack P according to the present disclosure, referring to FIG. 15, in an embodiment, the heating region 312 of the heating core 31 of the heating film sheet 3 has: a sixth central heating region 312B contacting a middle part of the air cooling assembly 4; and two sixth edge heating regions 312C provided at two sides of the sixth central heating region 312B and contacting two sides of the air cooling assembly 4.

In the battery pack P according to the present disclosure, in an embodiment, a rated heating power of the sixth edge heating region 312C is higher than a rated heating power of the sixth central heating region 312B.

In the battery pack P according to the present disclosure, in an embodiment, a ratio of the rated heating power of the sixth edge heating region 312C to the rated heating power of the sixth central heating region 312B is 2:1.

Figure 16:
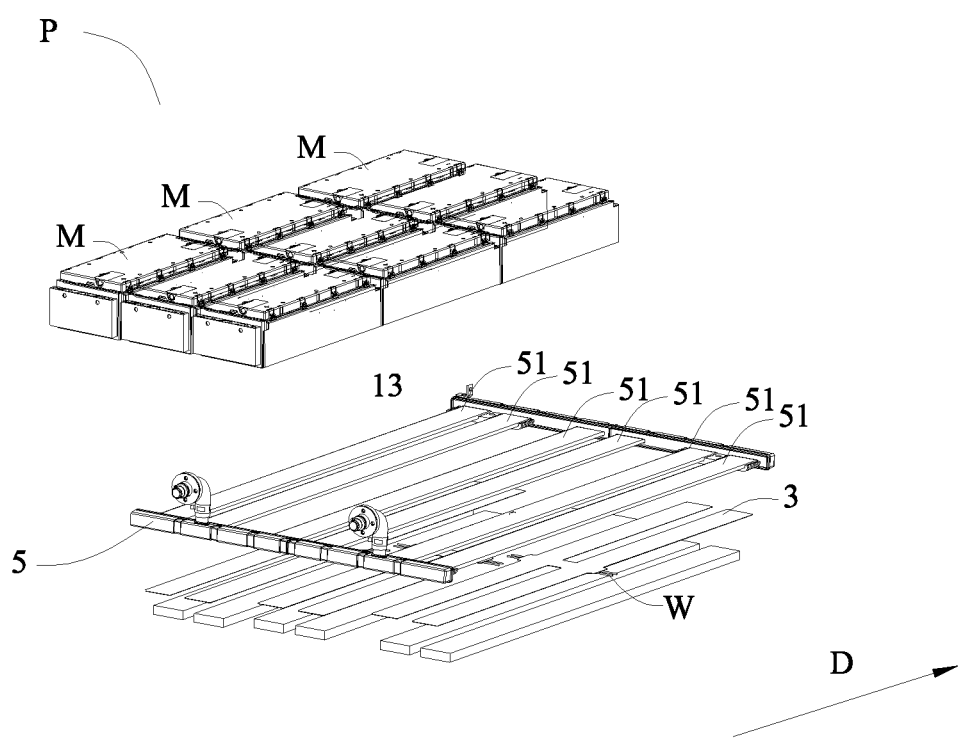
FIG. 16 is a perspective view of still another embodiment of the battery pack according to the present disclosure, in which a heating film sheet contacts a battery module via a liquid cooling assembly.

In the battery pack P according to the present disclosure, referring to FIG. 16, in an embodiment, the battery pack P further comprises: a liquid cooling assembly 5 provided to a bottom of the at least one battery module M.

In the battery pack P according to the present disclosure, referring to FIG. 16, in an embodiment, the heating film sheet 3 is provided under the liquid cooling assembly 5 and indirectly heats the at least one battery module M via the liquid cooling assembly 5.

In the battery pack P according to the present disclosure, referring to FIG. 16, in an embodiment, the liquid cooling assembly 5 comprises a plurality of liquid cooling tubes 51 which form a cooling circuit, each liquid cooling tube 51 contacts the bottom surface 13 of each mono-battery 1 of the battery module M which is positioned above each liquid cooling tube 51, correspondingly, the two adjacent liquid cooling tubes 51 contact one heating film sheet 3 which is positioned under the two adjacent liquid cooling tubes 51.

Figure 17:
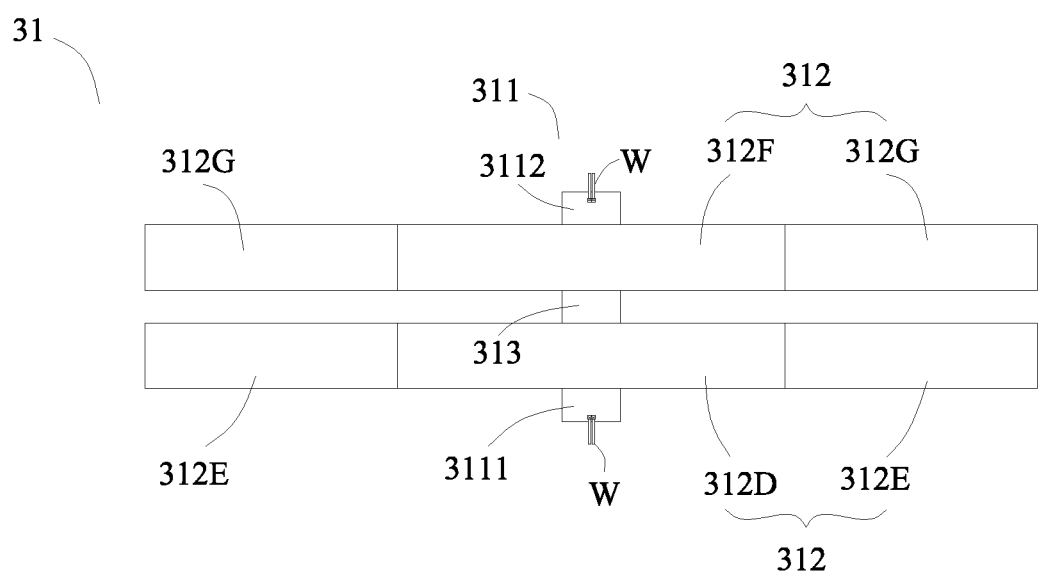
FIG. 17 is a schematic diagram of a heating core of a heating film sheet in FIG. 16.

In the battery pack P according to the present disclosure, referring to FIG. 17, in an embodiment, the heating region 312 of the heating core 31 of each heating film sheet 3 has: a seventh central heating region 312D corresponding to one liquid cooling tube 51 of the two adjacent liquid cooling tubes 51 and contacting a middle part of the one liquid cooling tube 51; two seventh edge heating regions 312E provided at two sides of the seventh central heating region 312D and contacting two sides of the one liquid cooling tube 51; a eighth central heating region 312F corresponding to the other liquid cooling tube 51 of the two adjacent liquid cooling tubes 51 and contacting a middle part of the other liquid cooling tube 51; and two eighth edge heating regions 312G provided at two sides of the eighth central heating region 312F and contacting two sides of the other liquid cooling tube 51. Correspondingly, the wire connection region 311 of the heating core 31 of each heating film sheet 3 has: a first wire connection region 3111 electrically connecting with the seventh central heating region 312D; and a second wire connection region 3112 electrically connecting with the eighth central heating region 312F. Correspondingly, the heating core 31 of each heating film sheet 3 further has: a bridge region 313 for electrically connecting the seventh central heating region 312D and the eighth central heating region 312F.

In the battery pack P according to the present disclosure, in an embodiment, a rated heating power of the seventh edge heating region 312E is higher than a rated heating power of the seventh central heating region 312D, a rated heating power of the eighth edge heating region 312G is higher than a rated heating power of the eighth central heating region 312F.

In the battery pack P according to the present disclosure, referring to FIG. 17, in an embodiment, a ratio of the rated heating power of the seventh edge heating region 312E to the rated heating power of the seventh central heating region 312D is 2:1; a ratio of the rated heating power of the eighth edge heating region 312G to the rated heating power of the eighth central heating region 312F is 2:1.

A working temperature in any one aspect of the battery unit E, the battery module M and battery pack P is −40° C.~120° C.

The insulating film 32 of the heating film sheet 3 in any one aspect of the battery unit E, the battery module M and the battery pack P is made of insulating silica gel, polyimide or Teflon.

An insulation resistance of the insulating film 32 of the heating film sheet 3 in any one aspect of the battery unit E, the battery module M and the battery pack P is 1000V/50 MΩ.

A thickness of the heating film sheet 3 in any one aspect of the battery unit E, the battery module M and the battery pack P is 0.5 mm~3 mm.

A thickness of the insulating film 32 of the heating film sheet 3 in any one aspect of the battery unit E, the battery module M and the battery pack P is 0.08 mm~2 mm.

The insulating film 32 of the heating film sheet 3 in any one aspect of the battery unit E, the battery module M and the battery pack P is made of insulating silica gel, and the thickness of the insulating film 32 is 0.2 mm~2 mm.

The insulating film 32 of the heating film sheet 3 in any one aspect of the battery unit E, the battery module M and the battery pack P is made of polyimide, and the thickness of the insulating film 32 is 0.08 mm~0.3 mm.

The two insulating films 32 of the heating film sheet 3 in any one aspect of the battery unit E, the battery module M and the battery pack P cover and seal the heating core 31 by way of binder, hot pressing or weft knitting.

The insulating film 32 of the heating film sheet 3 in any one aspect of the battery unit E, the battery module M and the battery pack P is made of polyimide and the binder uses a double-sided adhesive tape of 3M.

A thickness of each adhesive layer in the heating film sheet 3 in any one aspects of the battery unit E, the battery module M and the battery pack P is equal to or less than 0.15 mm.

The heating core 31 of the heating film sheet 3 in any one aspect of the battery unit E, the battery module M and the battery pack P is made of copper, silver, graphite, PTC, nickel chromium alloy, stainless steel or composite materials of them.

The rated heating powers of the different parts of the heating region 312 of the heating core 31 of the heating film sheet 3 in any one aspect of the battery unit E, the battery module M and the battery pack P are changed by one process of spraying powder, changing a sectional area of a metal through which a current flows, or changing a density per unit area of an internal material which generates heat. The process of spraying powder uses graphite powder, and adopts an automatic coating machine with a set path of coating, a flow of coating and the region of coating so as to control the requirements of powers in the different parts. The process of changing the sectional area of the metal through which the current flows uses a technology of laser structuring or the process of chemical precipitation setting, so as to realize varied specifications of a metal conductive path width. The process of changing the density per unit area of the material which generates heat uses a method of arrangement configuration, for example, metal conductors are arranged densely for a region of high heating power density, and metal conductors are arranged sparsely in a region of low heating power density.

The connection between the wire connection region 311 and the external wire W in any one aspect of the battery unit E, the battery module M and the battery pack P is by means of riveting and then welding with tin.

A pulling force which a welding joint between the wire connection region 311 and the external wire W in any one aspect of the battery unit E, the battery module M and the battery pack P bears is more than 150 N.

The external wire W in any one aspect of the battery unit E, the battery module M and the battery pack P uses two leads. The two leads can improve the current capability and the reliability of connection, and also can reduce the thermal resistance of connection so as to reduce heat generated.

The rated heating power of the wire connection region 311 of the heating film sheet 3 in any one aspect of the battery unit E, the battery module M and the battery pack P is equal to or less than 0.05 W/cm$^2$.

A range of the rated heating power of the heating region 312 of the heating film sheet 3 in any one aspect of the battery unit E, the battery module M and the battery pack P is 0.5 W/cm$^2$~2 W/cm$^2$.

What is claimed is:

1. A battery pack, comprising:
    a plurality of battery modules, and the plurality of battery modules being arranged in multiple rows, each battery module comprising a plurality of mono-batteries arranged side by side; and
    a plurality of heating film sheets;
    each heating film sheet comprising:
        a heating core generating heat when the heating core is electrified, and having:

a wire connection region for electrically connecting with external wires; and
a heating region electrically connecting to the wire connection region; and
two insulating films respectively covering two sides of the heating core;

wherein:

the battery pack further comprises a liquid cooling assembly provided to a bottom of the plurality of battery modules;

the plurality of heating film sheets are provided under the liquid cooling assembly and indirectly heat the plurality of battery modules via the liquid cooling assembly;

the liquid cooling assembly comprises a plurality of liquid cooling tubes which form a cooling circuit, each liquid cooling tube contacts a bottom surface of a respective mono-battery of the battery modules which is positioned above the liquid cooling tube;

two adjacent liquid cooling tubes contact one of the plurality of heating film sheets which is positioned under the two adjacent liquid cooling tubes;

the heating region of the heating core of each heating film sheet has: a seventh central heating region corresponding to one liquid cooling tube of the two adjacent liquid cooling tubes and contacting a middle part of the one liquid cooling tube, and the seventh central heating region heats a battery module in a middle of the corresponding row; two seventh edge heating regions provided at two sides of the seventh central heating region and contacting two sides of the one liquid cooling tube, and the two seventh edge heating regions heat battery modules at edges of the corresponding row; an eighth central heating region corresponding to the other liquid cooling tube of the two adjacent liquid cooling tubes and contacting a middle part of the other liquid cooling tube, and the eighth central heating region heat a battery module in the middle of the corresponding row; and two eighth edge heating regions provided at two sides of the eighth central heating region and contacting two sides of the other liquid cooling tube, and the two eighth edge heating regions heat the battery modules at the edges of the corresponding row;

a rated heating power of each seventh edge heating region is higher than a rated heating power of the seventh central heating region, a rated heating power of each eighth edge heating region is higher than a rated heating power of the eighth central heating region, a unit of the rated heating power is $W/cm^2$;

the wire connection region of the heating core of each heating film sheet has: a first wire connection region electrically connecting to the seventh central heating region; and a second wire connection region electrically connecting to the eighth central heating region;

the heating core of each heating film sheet further has a bridge region for electrically connecting the seventh central heating region and the eighth central heating region.

* * * * *